(12) United States Patent
Higuma et al.

(10) Patent No.: US 11,696,026 B2
(45) Date of Patent: Jul. 4, 2023

(54) CONTROL APPARATUS AND METHOD, AND STORAGE MEDIUM

(71) Applicant: CANON KABUSHIKI KAISHA, Tokyo (JP)

(72) Inventors: Kazuya Higuma, Saitama (JP); Yasuhiro Hatakeyama, Tochigi (JP); Gaku Takahashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/730,452

(22) Filed: Apr. 27, 2022

(65) Prior Publication Data

US 2022/0353429 A1    Nov. 3, 2022

(30) Foreign Application Priority Data

Apr. 30, 2021    (JP) ................. 2021-076973

(51) Int. Cl.
*H04N 23/67*    (2023.01)
*G03B 13/36*    (2021.01)
*H04N 23/959*   (2023.01)

(52) U.S. Cl.
CPC ........... *H04N 23/675* (2023.01); *G03B 13/36* (2013.01); *H04N 23/959* (2023.01)

(58) Field of Classification Search
CPC ....... H04N 5/232127; H04N 5/232125; H04N 23/675; H04N 23/959; H04N 23/76; G03B 13/36; G03B 17/14
See application file for complete search history.

(56) References Cited

U.S. PATENT DOCUMENTS

| 7,643,082 B2 | 1/2010 | Onozawa |
| 2015/0250381 A1* | 9/2015 | Bedard .............. G02B 23/2469 600/200 |
| 2020/0259992 A1* | 8/2020 | Ichinose ............ H04N 5/23258 |
| 2020/0409239 A1* | 12/2020 | Ito ........................ H04N 5/2351 |

FOREIGN PATENT DOCUMENTS

| JP | 2003140025 A | 5/2003 |
| JP | 2006227133 A | 8/2006 |
| JP | 2007279465 A | * 10/2007 |

OTHER PUBLICATIONS

JP-2007279465-A, English Translation (Year: 2007).*
Copending U.S. Appl. No. 17/730,422, filed Apr. 27, 2022.

* cited by examiner

*Primary Examiner* — Shahbaz Nazrul
(74) *Attorney, Agent, or Firm* — Rossi, Kimms & McDowell LLP

(57) ABSTRACT

A control apparatus includes a first acquiring unit configured to acquire a hyperfocal length of a lens apparatus that is attachable to, detachable from, and communicable with an image pickup apparatus, using information acquired by communication between the lens apparatus and the image pickup apparatus, and a second acquiring unit configured to acquire a position of a focus lens in the lens apparatus according to the hyperfocal length.

16 Claims, 5 Drawing Sheets

CONTROL APPARATUS AND METHOD, AND STORAGE MEDIUM

BACKGROUND OF THE INVENTION

Field of the Invention

The present invention relates to a lens interchangeable type image pickup apparatus and a lens apparatus.

Description of the Related Art

Deep focus imaging is one imaging method in which a depth of field is deepened to capture images while a range from a short distance to infinity is maintained in an in-focus state. A user can set deep focus by calculating a hyperfocal length (hyperfocal distance) based on a nominal focal length of a lens, the number of pixels on an image sensor, and a set aperture value (set F-number), and by manually moving a focus lens to a lens position corresponding to the hyperfocal length. However, this deep focus setting requires the user for special knowledge and skill.

Japanese Patent Laid-Open No. ("JP") 2006-227133 discloses a lens integrated type image pickup apparatus that automatically performs deep focus imaging as a countermeasure to autofocus ("AF") failure in which an object cannot be focused by AF. JP 2003-140025 discloses a lens integrated type image pickup apparatus that enables a normal imaging mode that provides AF and a snapshot mode that provides deep focus imaging to be selected.

The lens integrated type image pickup apparatuses disclosed in JPs 2006-227133 and 2003-140025 can automatically set deep focus in deep focus imaging. However, each of JPs 2006-227133 and 2003-140025 is silent about automatic deep focus setting in a lens interchangeable type image pickup system in which a variety of types of interchangeable lenses are attachable to an image pickup apparatus.

SUMMARY OF THE INVENTION

The present invention provides an image pickup apparatus, a lens apparatus, a control method, and a storage medium for an interchangeable lens image pickup system, each of which can easily provide deep focus imaging in a situation intended by a user.

A control apparatus according to one aspect of the present invention includes at least one processor, and at least one memory coupled to the at least one processor storing instructions that, when executed by the at least one processor, cause the at least one processor to function as a first acquiring unit configured to acquire a hyperfocal length of a lens apparatus that is attachable to, detachable from, and communicable with an image pickup apparatus, using information acquired by communication between the lens apparatus and the image pickup apparatus, and a second acquiring unit configured to acquire a position of a focus lens in the lens apparatus according to the hyperfocal length.

A control apparatus according to another aspect of the present invention includes at least one processor, and at least one memory coupled to the at least one processor storing instructions that, when executed by the at least one processor, cause the at least one processor to function as a transmitting unit configured to transmit information for enabling a hyperfocal length of a lens apparatus to be acquired, the lens apparatus being attachable to, detachable from, and communicable with an image pickup apparatus, and a receiving unit configured to receive information for driving a focus lens of the lens apparatus to a lens position corresponding to the hyperfocal length.

A control method corresponding to the above control apparatus also constitutes another aspect of the present invention. A non-transitory computer-readable storage medium storing a program that causes a computer to execute the above control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1:
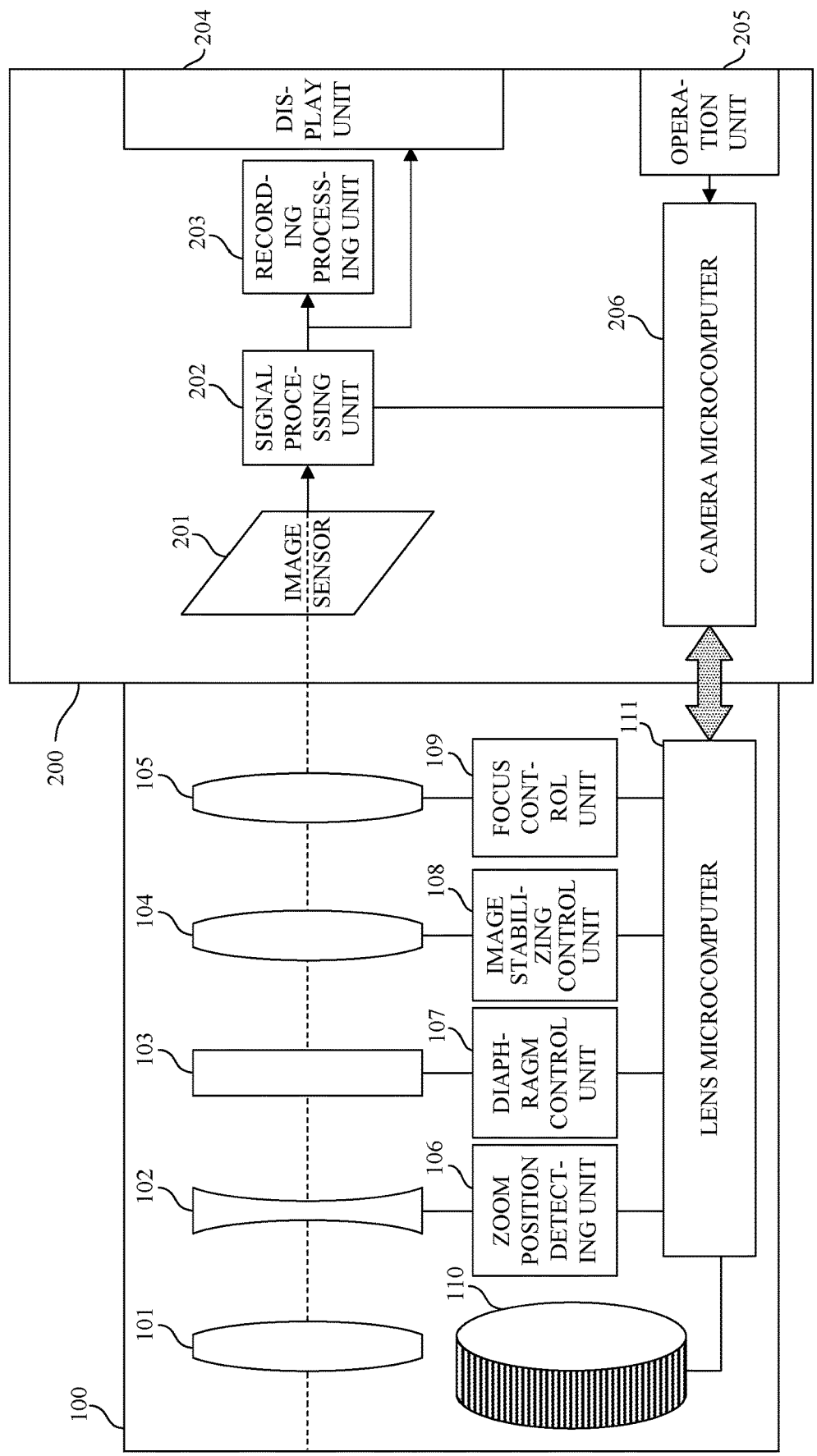
FIG. 1 is a block diagram illustrating a configuration of a lens interchangeable type image pickup system according to one embodiment of the present invention.

FIG. 1 illustrates a configuration of a lens interchangeable type image pickup system according to one embodiment of the present invention. The image pickup system includes a camera body 200 as an image pickup apparatus and an interchangeable lens 100 as a lens apparatus attachable to, detachable from, and communicable with the camera body 200.

The interchangeable lens 100 is mechanically and electrically connected to the camera body 200 via an unillustrated mount. The interchangeable lens 100 includes an imaging lens as an imaging optical system and a lens microcomputer 111, and operates by receiving a power supply from the camera body 200 via an unillustrated power supply terminal provided on the mount.

The camera body 200 includes an image sensor 201 including phase difference focus detecting pixels and the like, a signal processing circuit 202, a recording processing unit 203, a display unit 204, an operation unit 205, and a camera microcomputer 206.

The image sensor 201 performs a photoelectric conversion (imaging) of an object image formed by the imaging lens and outputs an analog imaging signal as an electric signal. The analog imaging signal is converted into a digital imaging signal by an unillustrated A/D conversion circuit.

The signal processing circuit 202 generates a video signal (captured image) by performing various image processing for the digital imaging signal. The signal processing circuit 202 also generates focus information indicating a contrast state of the object image, that is, a focus state of the imaging lens, and luminance information indicating an exposure state from the video signal.

The display unit 204 is a rear monitor or an electronic viewfinder, and displays a live-view image corresponding to the video signal from the signal processing circuit 202 so as to enable the user to confirm the object and composition. The recording processing unit 203 stores the video signal from the signal processing circuit 202 as still image data or moving (motion) image data in an unillustrated recording medium.

The camera microcomputer 206 as a camera control unit (first acquiring unit, second acquiring unit, transmitting unit, and receiving unit) controls the camera body 200 in response to an input from an imaging instruction switch and various setting switches included in the operation unit 205. The operation unit 205 further includes a switch (deep focus setting switch) for commanding a deep focus setting described below. The deep focus setting switch may be a dedicated switch or a function assignable switch to which a function of a deep focus setting switch is assigned by the user by a customizing function.

The camera microcomputer 206 communicates with the lens microcomputer 111 via the communication terminal provided on the mount. More specifically, the camera microcomputer 206 transmits to the lens microcomputer 111 a diaphragm control command according to the luminance information and a focus control command according to the focus information generated from the output of the phase difference detecting pixels of the image sensor 201. The lens microcomputer 111 transmits information for use with deep focus control, which will be described below, to the camera microcomputer 206.

The imaging lens included in the interchangeable lens 100 includes a field lens 101, a magnification-varying (zoom) lens 102, a diaphragm (aperture stop) unit 103, an image stabilizing lens 104, and a focus lens 105. The interchangeable lens 100 includes an unillustrated zoom operation ring, a focus operation ring 110, and the lens microcomputer 111 described above.

The lens microcomputer 111 transmits lens data including identification (ID) information and optical information on the interchangeable lens 100 to the camera body 200 in response to a transmission request transmitted from the camera body 200 (camera microcomputer 206). The lens microcomputer 111 receives the camera data including various information on the camera body 200 from the camera body 200 in response to a reception request transmitted from the camera body 200.

The lens microcomputer 111 causes a diaphragm control unit 107 to open and close the diaphragm unit 103 in response to the diaphragm control command received from the camera body 200. Positions of diaphragm blades of the diaphragm unit 103 are detected by a sensor such as a Hall element, and diaphragm position data is output to the lens microcomputer 111. The diaphragm control unit 107 that has received a driving command from the lens microcomputer 111 drives the diaphragm blades to open and close by driving a diaphragm actuator that includes a stepping motor, a voice coil motor, or the like. Thereby, a light amount is adjusted by the diaphragm unit 103.

The lens microcomputer 111 causes the focus control unit 109 to drive the focus lens 105 in an optical axis direction in response to the focus control command received from the camera body 200. The position of the focus lens 105 is detected with a sensor such as a photo-interrupter, and the focus position data is output to the lens microcomputer 111. The lens microcomputer 111 calculates a target position of the focus lens 105 based on the focus position data and the focus driving amount data included in the focus control command. The focus control unit 109 that has received the driving command including the target position from the lens microcomputer 111 drives a focus actuator such as a stepping motor to move the focus lens 105. Thereby, autofocus (AF) is performed. A lens control unit (first acquiring unit, second acquiring unit, transmitting unit, and receiving unit) includes the lens microcomputer 111 and the focus control unit 109.

The lens microcomputer 111 can also cause the focus control unit 109 to move the focus lens 105 according to an operation amount of the focus operation ring 110. Thereby, manual focus (MF) is performed.

The zoom lens 102 is driven in the optical axis direction via an unillustrated driving mechanism when the user operates the zoom operation ring. Thereby, a magnification variation that changes a focal length of the imaging lens is performed. A zoom position detecting unit 106 detects the position (zoom position) of the zoom lens 102 using a sensor such as a variable resistor, and outputs the zoom position data to the lens microcomputer 111. The lens microcomputer 111 uses the zoom position data to generate information on the focal length.

The image stabilizing lens 104 reduces (corrects) an image blur caused by camera shake or the like by moving (shifting) in a direction having a component orthogonal to the optical axis of the imaging lens. An image stabilizing control unit 108 that has received an image stabilizing command from the lens microcomputer 111 drives an image stabilizing actuator including a voice coil motor or the like in response to the shake detected by a vibration sensor such as an unillustrated vibration gyro so as to shift the image stabilizing lens 104. Thereby, optical vibration isolation is performed.

A description will now be given of deep focus control according to this embodiment. The camera microcomputer 206 starts the deep focus control by detecting that the operation unit 205 (deep focus setting switch) has been operated by the user. For example, the camera microcomputer 206 calculates a hyperfocal length using the focal length of the imaging lens received from the lens microcomputer 111, and transmits the deep focus drive command to the lens microcomputer 111 together with the hyperfocal length.

The hyperfocal length is the closest distance so that infinity is included in the depth of field, and can be calculated by the following equation (1):

$$h = f^2/(F\delta) \tag{1}$$

h: Hyperfocal length [mm]
F: Aperture value (F-number)
f: Focal length of the imaging lens [mm]
δ: Diameter of permissible circle of confusion [mm]

For example, the lens microcomputer 111 acquires the position of the focus lens 105 (referred to as the deep focus position hereinafter) in which the imaging lens is in a deep focus state as a lens position according to the received hyperfocal length. The lens microcomputer 111 calculates a driving amount from the current position of the focus lens 105 to the deep focus position. The lens microcomputer 111 causes the focus control unit 109 to drive the focus lens 105 by the calculated driving amount. Thereby, the deep focus state is automatically set (deep focus setting is automatically made). A description will now be given of specific processing for deep focus control according to first to fourth embodiments.

First Embodiment

Figure 2:
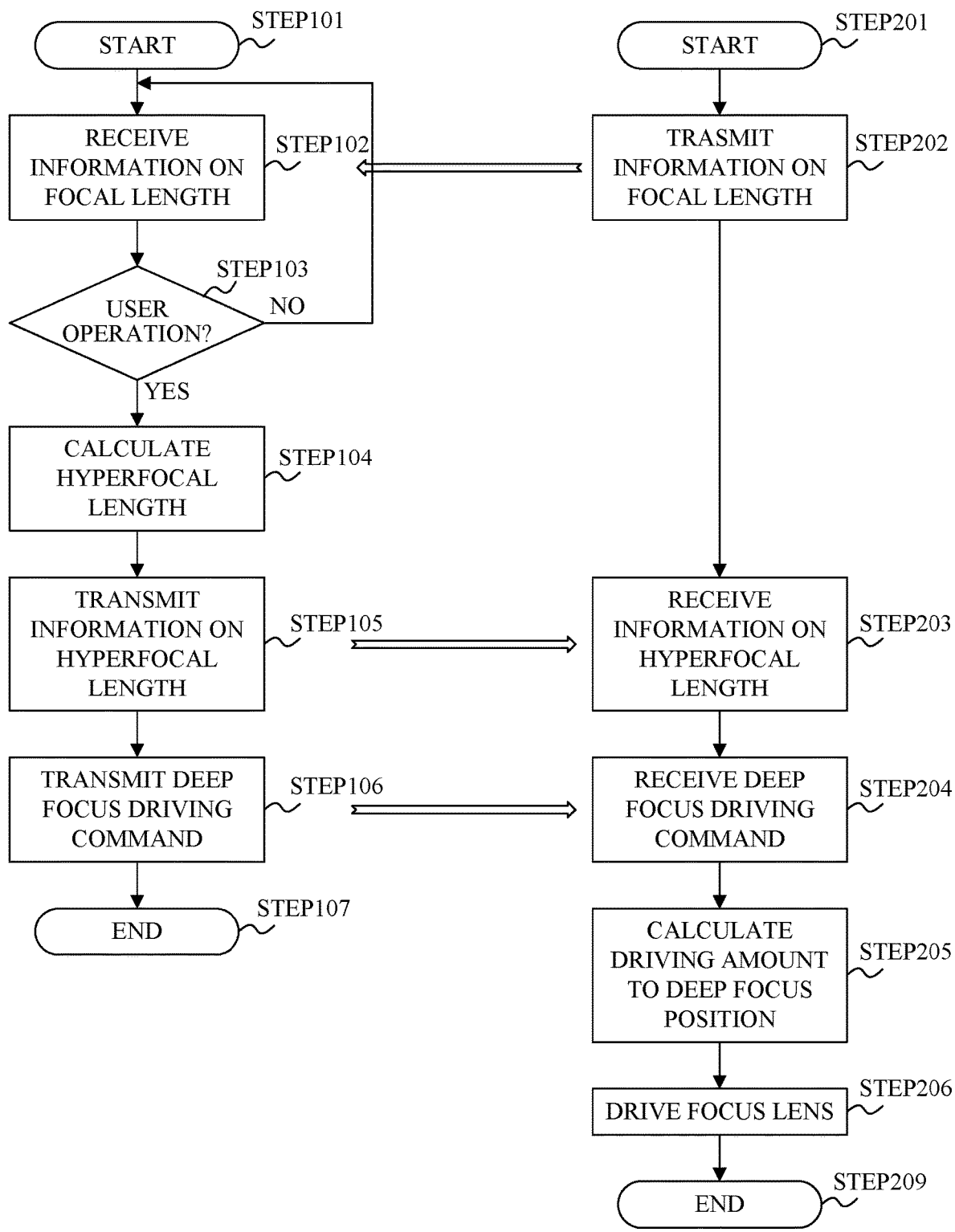
FIG. 2 illustrates flowcharts of processing to be executed in a first embodiment.

Flowcharts of FIG. 2 illustrate processing to be executed by the camera microcomputer 206 and the lens microcomputer 111 for the deep focus control in the first embodiment.

The camera microcomputer 206 and the lens microcomputer 111 each execute this processing according to a computer program. The processing starting from Step 101 indicates processing to be executed by the camera microcomputer 206, and the processing starting from Step 201 indicates processing to be executed by the lens microcomputer 111. An arrow between the two flowcharts indicates a communication direction of information.

The camera microcomputer 206 that has started processing in Step 101 receives information on the current focal length (first information) of the imaging lens from the lens microcomputer 111 in Step 102. Information on the focal length will be described below. Since the focal length of the imaging lens changes depending on the operation of the zoom operation ring by the user, polling may be performed in a short cycle. In a case where polling is unavailable in a sufficiently short cycle, the order of Steps 102 and 103, which will be described below, may be changed.

In Step 103, the camera microcomputer 206 waits for an operation of the deep focus setting switch by the user. The flow returns to Step 102 if no operation is detected, and proceeds to Step 104 if the operation is detected.

In Step 104, the camera microcomputer 206 calculates (acquires) a hyperfocal length using a focal length derived from the information received from the lens microcomputer 111 in Step 102, an aperture value (F-number) and a diameter of a permissible circle of confusion ("PCOC") set in imaging in the deep focus state (deep focus imaging) and the expression (1). Alternatively, data on the hyperfocal length previously calculated by a combination of different focal lengths, aperture values, and diameters of PCOC may be stored as table data, and a corresponding hyperfocal length may be read out (acquired) from the data.

Next, in Step 105, the camera microcomputer 206 transmits the acquired information on the hyperfocal length to the lens microcomputer 111. The information on the hyperfocal length (second information) may be information indicating the hyperfocal length itself or information that is convertible into the hyperfocal length by the lens microcomputer 111, such as parameters (variables) of a function indicating the hyperfocal length.

Next, in Step 106, the camera microcomputer 206 transmits a deep focus driving command to the lens microcomputer 111. Then, the camera microcomputer 206 ends the processing in Step 107.

On the other hand, the lens microcomputer 111 that has started the processing in Step 201 acquires the current focal length of the imaging lens from the zoom position data obtained from the zoom position detecting unit 106 in Step 202, and transmits information on the focal length to the camera microcomputer 206. The information on the focal length may be information indicating the focal length itself or information such as the zoom position is convertible into the focal length by the camera microcomputer 206.

Next, in Step 203, the lens microcomputer 111 receives information on the hyperfocal length from the camera microcomputer 206. The lens microcomputer 111 receives the deep focus driving command from the camera microcomputer 206 in Step 204.

Next, in Step 205, the lens microcomputer 111 converts the hyperfocal length obtained from the information received in Step 203 into a deep focus position, and calculates a difference (driving amount) from the current position of the focus lens 105 to the deep focus position.

Next, in Step 206, the lens microcomputer 111 causes the focus control unit 109 to drive the focus lens 105 by the drive amount calculated in Step 205 to obtain a deep focus state. The lens microcomputer 111 ends the processing in Step 207.

This embodiment can easily provide deep focus imaging in a situation (at an arbitrary timing) intended by the user.

Second Embodiment

Next, a description will be given of a second embodiment. In the first embodiment described above, the lens microcomputer 111 calculates (converts) a deep focus position using information on a hyperfocal length acquired by the camera microcomputer 206 and calculates a driving amount of the focus lens 105. On the other hand, in this embodiment, the camera microcomputer 206 acquires a hyperfocal length and converts it into a deep focus position, and transmits information (second information) on a deep focus position to the lens microcomputer 111.

Figure 3:
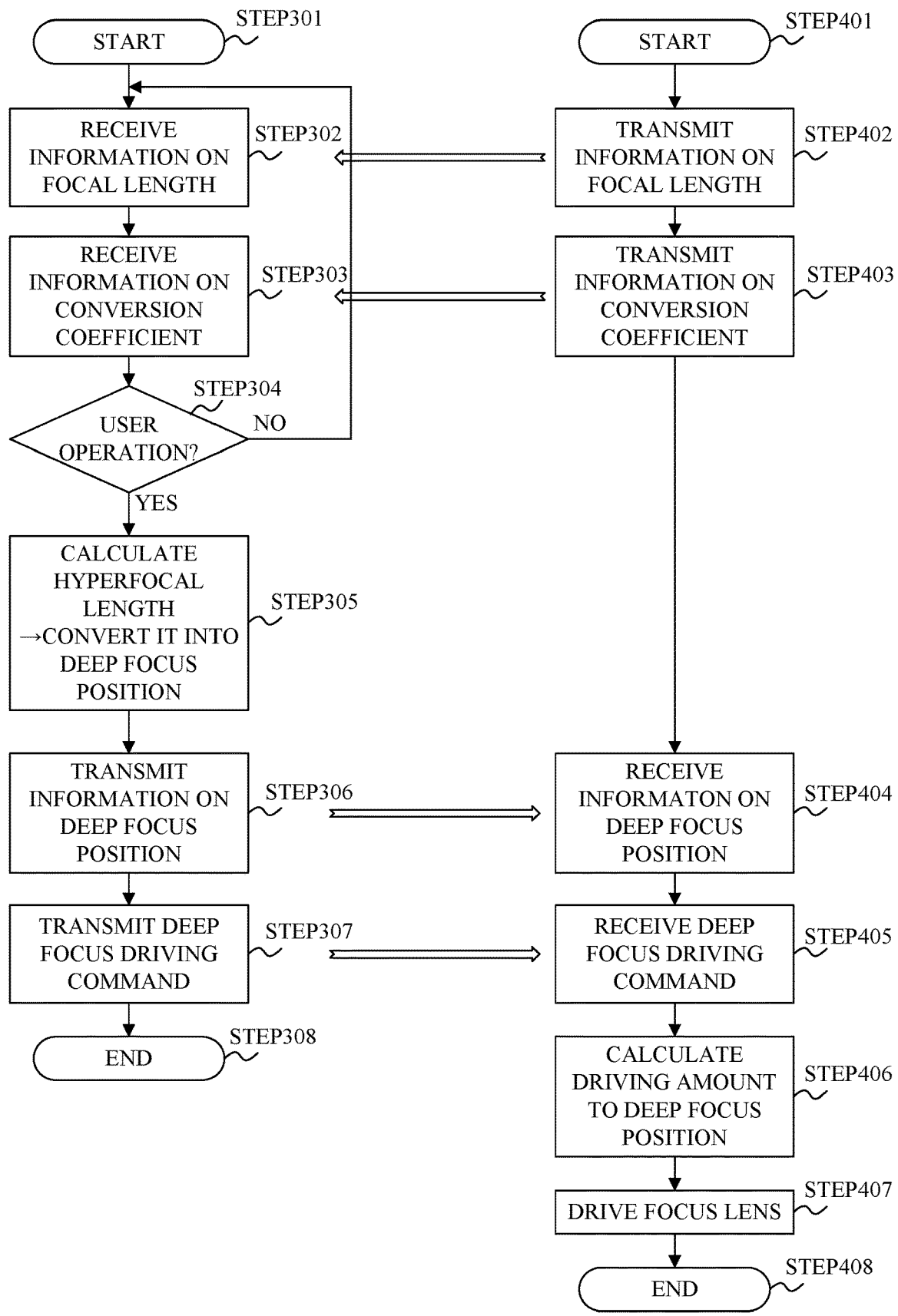
FIG. 3 illustrates flowcharts of processing to be executed in a second embodiment.

Flowcharts of FIG. 3 illustrate processing to be executed by the camera microcomputer 206 and the lens microcomputer 111 for deep focus control in the second embodiment. The processing starting with Step 301 indicates processing to be executed by the camera microcomputer 206, and the processing starting with Step 401 indicates processing to be executed by the lens microcomputer 111.

The camera microcomputer 206 that has started processing in Step 301 receives information on the current focal length of the imaging lens from the lens microcomputer 111 in Step 302. In Step 303, the camera microcomputer 206 receives from the lens microcomputer 111 information (third information) on a conversion coefficient for converting the focal length obtained from the information received in Step 302 to the position of the focus lens 105. Information on the conversion factor will be described below.

Since the focal length and conversion coefficient of the imaging lens change depending on the operation of the zoom operation ring by the user, polling may be performed in a short cycle. The focal length and the conversion coefficient may be acquired at the same position of the zoom lens 102. Therefore, Steps 302 and 303 may be performed in as short a time as possible or at the same time (in parallel).

In Step 304, the camera microcomputer 206 waits for an operation of the deep focus setting switch by the user. The flow returns to Step 302 if no operation is detected, and proceeds to Step 305 if the operation is detected.

In Step 305, the camera microcomputer 206 acquires a hyperfocal length using a focal length derived from the information received from the lens microcomputer 111 in Step 302, an aperture value (F-number) set in deep focus imaging, a diameter of PCOC, and the expression (1) or the table data described in the first embodiment. The camera microcomputer 206 converts the acquired hyperfocal length into a deep focus position using the conversion coefficient obtained from the received information in Step 303. The camera microcomputer 206 transmits information on the deep focus position to the lens microcomputer 111 in Step 306. The information on the deep focus position may be information indicating the position of the focus lens 105 itself or information that is convertible into the position of the focus lens 105 by the lens microcomputer 111.

Next, in Step 307, the camera microcomputer 206 transmits a deep focus driving command to the lens microcomputer 111. The camera microcomputer 206 ends the processing in Step 308.

On the other hand, the lens microcomputer 111 that has started the processing in Step 401 acquires the current focal length of the imaging lens from the zoom position data obtained from the zoom position detecting unit 106 in Step 402, and transmits information on the focal length to the camera microcomputer 206.

Next, in Step 403, the lens microcomputer 111 transmits the information on the conversion coefficient described above to the camera microcomputer 206. The information on the conversion coefficient may be information indicating the conversion coefficient itself or information that is convertible into the conversion coefficient by the camera microcomputer 206, similarly to the information on the focal length.

Next, in Step 404, the lens microcomputer 111 receives the information on the deep focus position from the camera microcomputer 206. The lens microcomputer 111 receives the deep focus driving command from the camera microcomputer 206 in Step 405.

Next, in Step 406, the lens microcomputer 111 calculates a driving amount from the current position of the focus lens 105 to the deep focus position obtained from the information received in Step 404.

In Step 407, the lens microcomputer 111 causes the focus control unit 109 to drive the focus lens 105 by the driving amount calculated by Step 406 to obtain a deep focus state. The lens microcomputer 111 ends the processing in Step 408.

In this embodiment, the camera microcomputer 206 performs from the calculation of the hyperfocal length to the conversion into the deep focus position. Therefore, even with the low processing capability of the lens microcomputer, this embodiment can easily provide deep focus imaging in a situation (at an arbitrary timing) intended by the user.

Third Embodiment

Next, a third embodiment will be described. In this embodiment, the lens microcomputer 111 calculates the hyperfocal length.

Figure 4:
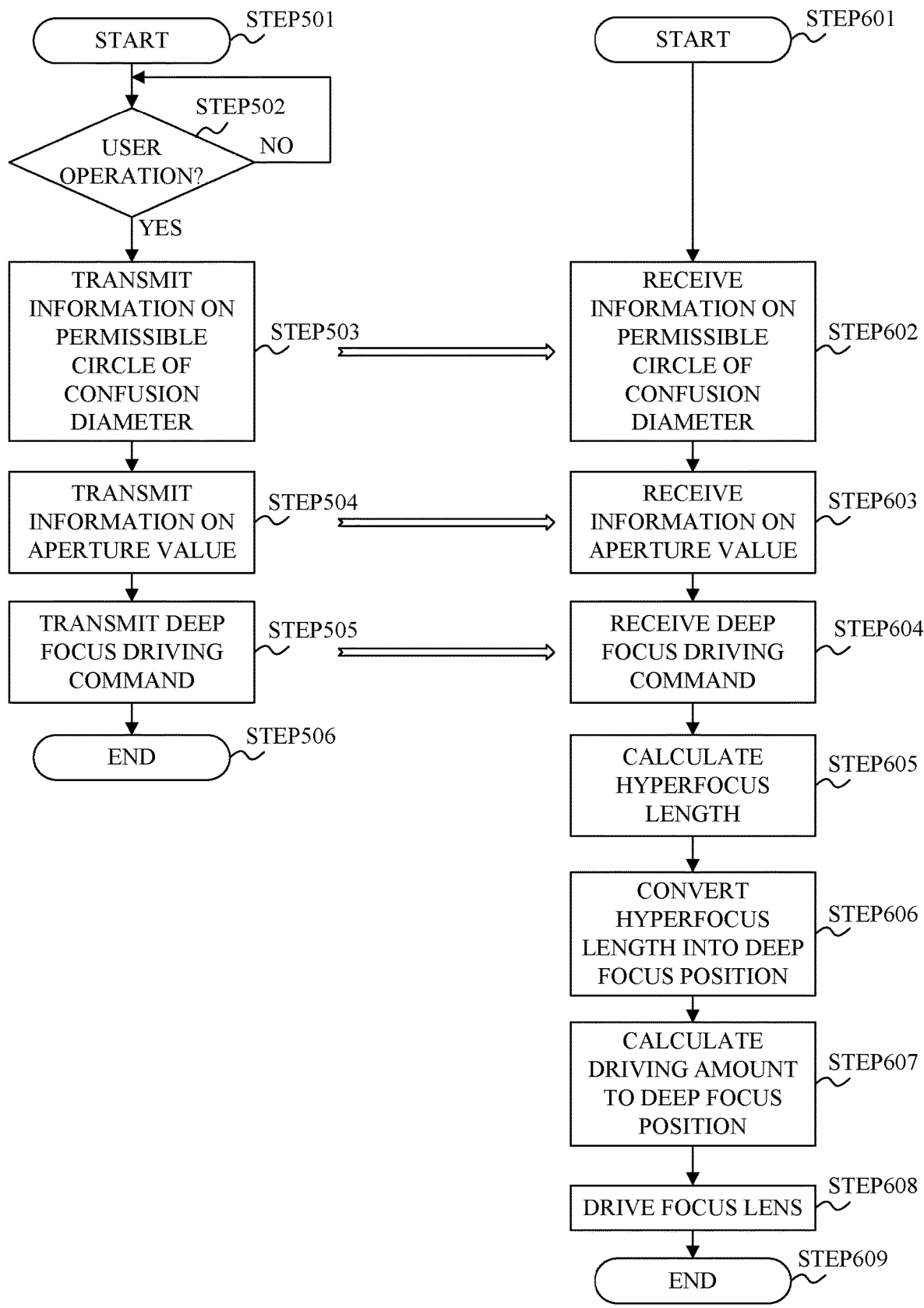
FIG. 4 illustrates flowcharts of processing to be executed in a third embodiment.

Flowcharts of FIG. 4 illustrate processing to be executed by the camera microcomputer 206 and the lens microcomputer 111 for deep focus control in the third embodiment. The processing starting from Step 501 indicates processing to be executed by the camera microcomputer 206, and the processing starting from Step 601 indicates processing to be executed by the lens microcomputer 111.

The camera microcomputer 206 that has started the processing in Step 501 waits for an operation of the deep focus setting switch by the user in Step 502. The flow proceeds to Step 503 when the operation is detected.

In Step 503, the camera microcomputer 206 transmits information (fourth information) on a diameter of PCOC to the lens microcomputer 111. In Step 504, the camera microcomputer 206 transmits to the lens microcomputer 111 information (fourth information) on the aperture value set in the deep focus imaging. The information on the diameter of PCOC and the aperture value may be information indicating the diameter of PCOC and the aperture value themselves or information that is convertible into the diameter of PCOC and the aperture value by the lens microcomputer 111. In the interchangeable lens 100, in a case where the diameter of PCOC for calculating the hyperfocal length has been determined, it is unnecessary to transmit the information on the diameter of PCOC from the camera microcomputer 206 to the lens microcomputer 111.

Next, in Step 505, the camera microcomputer 206 transmits a deep focus driving command to the lens microcomputer 111. The camera microcomputer 206 ends the processing in Step 506.

On the other hand, the lens microcomputer 111 that has started the processing from Step 601 receives the information on the diameter of PCOC from the camera microcomputer 206 in Step 602 and the information on the aperture value from the camera microcomputer 206 in Step 603.

Next, when the lens microcomputer 111 receives the deep focus driving command from the camera microcomputer 206 in Step 604, the flow proceeds to Step 605. In Step 605, the lens microcomputer 111 acquires the current focal length of the imaging lens from the zoom position data obtained from the zoom position detecting unit 106. The lens microcomputer 111 calculates (acquires) the hyperfocal length using the expression (1), the focal length, and the diameter of PCOC and the aperture value derived from the information received in Steps 602 and 603.

Next, in Step 606, the lens microcomputer 111 converts the hyperfocal length acquired in Step 605 into a deep focus position. The coefficient for use with this conversion differs for each focal length and is selected based on the focal length or the zoom position data obtained from the zoom position detecting unit 106.

Next, in Step 607, the lens microcomputer 111 calculates a driving amount from the current position of the focus lens 105 to the deep focus position obtained in Step 606.

Next, in Step 608, the lens microcomputer 111 causes the focus control unit 109 to drive the focus lens 105 by the driving amount calculated by Step 607 to obtain a deep focus state. The lens microcomputer 111 ends the processing in Step 609.

In this embodiment, the lens microcomputer 111 performs from the calculation of the hyperfocal length to the conversion to the deep focus position. This embodiment can easily provide deep focus imaging in a situation (at an arbitrary timing) intended by the user while reducing the processing performed by the camera microcomputer 206.

Fourth Embodiment

Next, a fourth embodiment will be described. In this embodiment as well, the lens microcomputer 111 acquires the hyperfocal length, but the processing load of the lens microcomputer 111 is suppressed.

Figure 5:
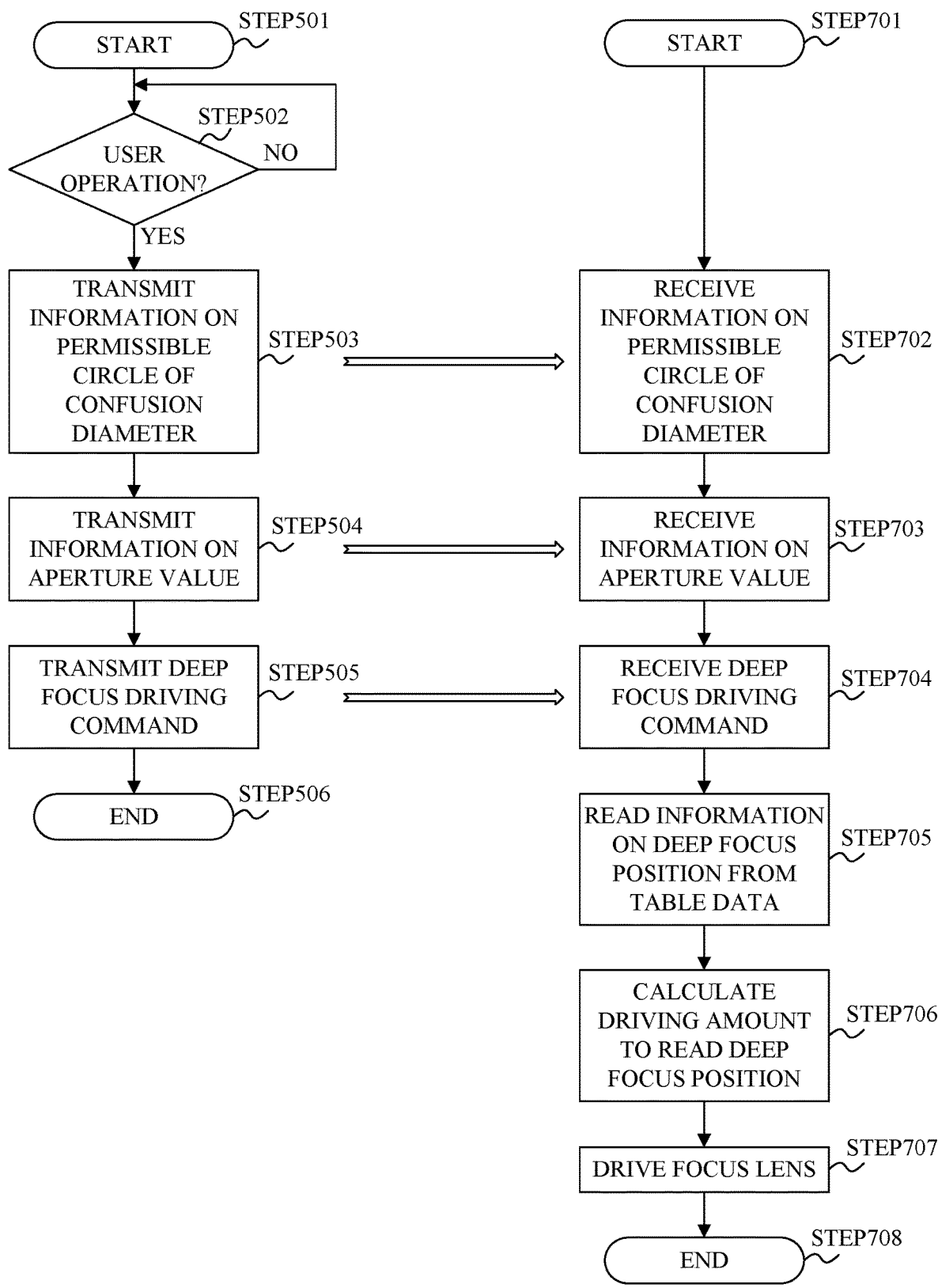
FIG. 5 illustrates flowcharts of processing to be executed in a fourth embodiment.

Flowcharts of FIG. 5 illustrate the processing to be executed by the camera microcomputer 206 and the lens microcomputer 111 for deep focus control in the fourth embodiment. The processing starting from Step 501 indicates processing to be executed by the camera microcomputer 206, and is the same as that of the third embodiment. The processing starting from Step 701 indicates processing to be executed by the lens microcomputer 111.

The lens microcomputer 111 that has started the process in Step 701 performs the processing from Step 702 to Step 704. These steps are the same as Step 602 to Step 604 in the third embodiment.

In Step 705, the lens microcomputer 111 acquires a deep focus position. The lens microcomputer 111 stores, as the table data, data of the deep focus position with a focal length (or zoom position), an aperture value, and a diameter of PCOC as parameters. The lens microcomputer 111 reads out of the table data a deep focus position that corresponds to a combination of the diameter of PCOC and aperture value obtained from the information received from the camera microcomputer 206 in Steps 702 and 703 and the focal length (or zoom position) obtained from the zoom position data from the zoom position detecting unit 106.

Next, in Step 706, the lens microcomputer 111 calculates a driving amount from the current position of the focus lens 105 to the deep focus position read in Step 705.

Next, in Step 707, the lens microcomputer 111 causes the focus control unit 109 to drive the focus lens 105 by the driving amount calculated in Step 706 to obtain a deep focus state. The lens microcomputer 111 ends the processing in Step 708.

This embodiment stores the table data that shows the deep focus position for each combination of the focal length, the aperture value, and the diameter of PCOC in the lens microcomputer 111, reads out a target deep focus position in response to a reception of the deep focus driving command, and drives the focus lens 105. Thereby, the processing load of the lens microcomputer 111 can be reduced, and even with the low processing capability of the lens microcomputer 111, this embodiment can easily provide deep focus imaging in a situation (at an arbitrary timing) intended by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-076973, filed on Apr. 30, 2021, which is hereby incorporated by reference herein in its entirety.

What is claimed is:

1. A control apparatus for an image pickup apparatus comprising:
at least one processor; and
at least one memory coupled to the at least one processor storing instructions that, when executed by the at least one processor, cause the at least one processor to function as:
a receiving unit configured to receive from a lens apparatus that is attachable to, detachable from, and communicable with the image pickup apparatus, first information on a focal length of the lens apparatus:
a first acquiring unit configured to acquire a hyperfocal length of the lens apparatus-using the first information; and
a transmitting unit configured to transmit to the lens apparatus second information for driving a focus lens in the lens apparatus to a lens position corresponding to the hyperfocal length.

2. The control apparatus according to claim 1, wherein the first acquiring unit acquires the hyperfocal length using the first information, a diameter of a permissible circle of confusion, and an F-number set in the lens apparatus.

3. The control apparatus according to claim 2, wherein the transmitting unit transmits information on the F-number to the lens apparatus, and causes the lens apparatus to drive a diaphragm in the lens apparatus according to the information on the F-number.

4. The control apparatus according to claim 1, wherein the transmitting unit transmits to the lens apparatus information on the hyperfocal length for acquiring the lens position as the second information.

5. The control apparatus according to claim 1, wherein
the receiving unit receives from the lens apparatus third information for acquiring the lens position corresponding to the hyperfocal length, and
wherein the transmitting unit transmits as the second information to the lens apparatus information on the lens position acquired by using the hyperfocal length and the third information.

6. A control apparatus for a lens apparatus comprising:
at least one processor; and
at least one memory coupled to the at least one processor storing instructions that, when executed by the at least one processor, cause the at least one processor to function as:
a receiving unit configured to receive from an image pickup apparatus that is attachable to, detachable from, and communicable with the lens apparatus, fourth information for acquiring a hyperfocal length of the lens apparatus;
a second acquiring unit configured to acquire the hyperfocal length of the lens apparatus using the fourth information;
a third acquiring unit configured to acquire a lens position that is a position of a focus lens in the lens apparatus corresponding to the hyperfocal length; and
a driving unit configured to drive the focus lens to the lens position.

7. The control apparatus according to claim 6, wherein the information for acquiring the hyperfocal length of the lens apparatus includes information on a diameter of a permissible circle of confusion and information on an F-number set by the lens apparatus.

8. The control apparatus according to claim 7, wherein the lens apparatus includes a diaphragm, and
wherein the control apparatus drives the diaphragm according to the information on the F-number.

9. A control apparatus for a lens apparatus comprising:
at least one processor; and at least one memory coupled to the at least one processor storing instructions that, when executed by the at least one processor, cause the at least one processor to function as:

a transmitting unit configured to transmit to an image pickup apparatus that is attachable to, detachable from, and communicable with the lens apparatus, first information on a focal length of the lens apparatus; and a receiving unit configured to receive from the image pickup apparatus second information for driving a focus lens in the lens apparatus to a lens position corresponding to the hyperfocal length of the lens apparatus, wherein the image pickup apparatus has acquired the hyperfocal length of the lens apparatus using the first information.

10. The control apparatus according to claim 9, wherein the lens apparatus includes a diaphragm, and wherein the receiving unit receives information on an F-number from the image pickup apparatus, drives the focus lens to the lens position, and drives the diaphragm according to the information on the F-number.

11. The control apparatus according to claim 9, wherein the receiving unit receives information on the hyperfocal length from the image pickup apparatus as the second information, and wherein the control apparatus acquires the lens position using the information on the hyperfocal length.

12. The control apparatus according to claim 9, wherein the transmitting unit transmits to the image pickup apparatus third information for acquiring the lens position corresponding to the hyperfocal length, and wherein the receiving unit receives information on the lens position as the second information from the image pickup apparatus.

13. A control method for a lens apparatus comprising the steps of:

receiving from an image pickup apparatus that is attachable to, detachable from, and communicable with the lens apparatus, fourth information for acquiring a hyperfocal length of the lens apparatus;

acquiring the hyperfocal length of the lens apparatus using the fourth information;

acquiring a lens position that is a position of a focus lens in the lens apparatus corresponding to the hyperfocal length; and driving the focus lens to the lens position.

14. A control method for an image pickup apparatus comprising the steps of:

receiving from a lens apparatus that is attachable to, detachable from, and communicable with an image pickup apparatus, first information on a focal length of the lens apparatus;

acquiring a hyperfocal length of the lens apparatus using the first information; and transmitting to the lens apparatus second information for driving a focus lens in the lens apparatus to a lens position corresponding to the hyperfocal length.

15. A non-transitory computer-readable storage medium storing a program that causes a computer to execute the control method according to claim 13.

16. A non-transitory computer-readable storage medium storing a program that causes a computer to execute the control method according to claim 14.

* * * * *